Oct. 4, 1927.

F. A. HUFF

AUTOMOBILE SEAT

Filed Feb. 20, 1926

Inventor
Floyd A Huff
By Watson E. Coleman
Attorney

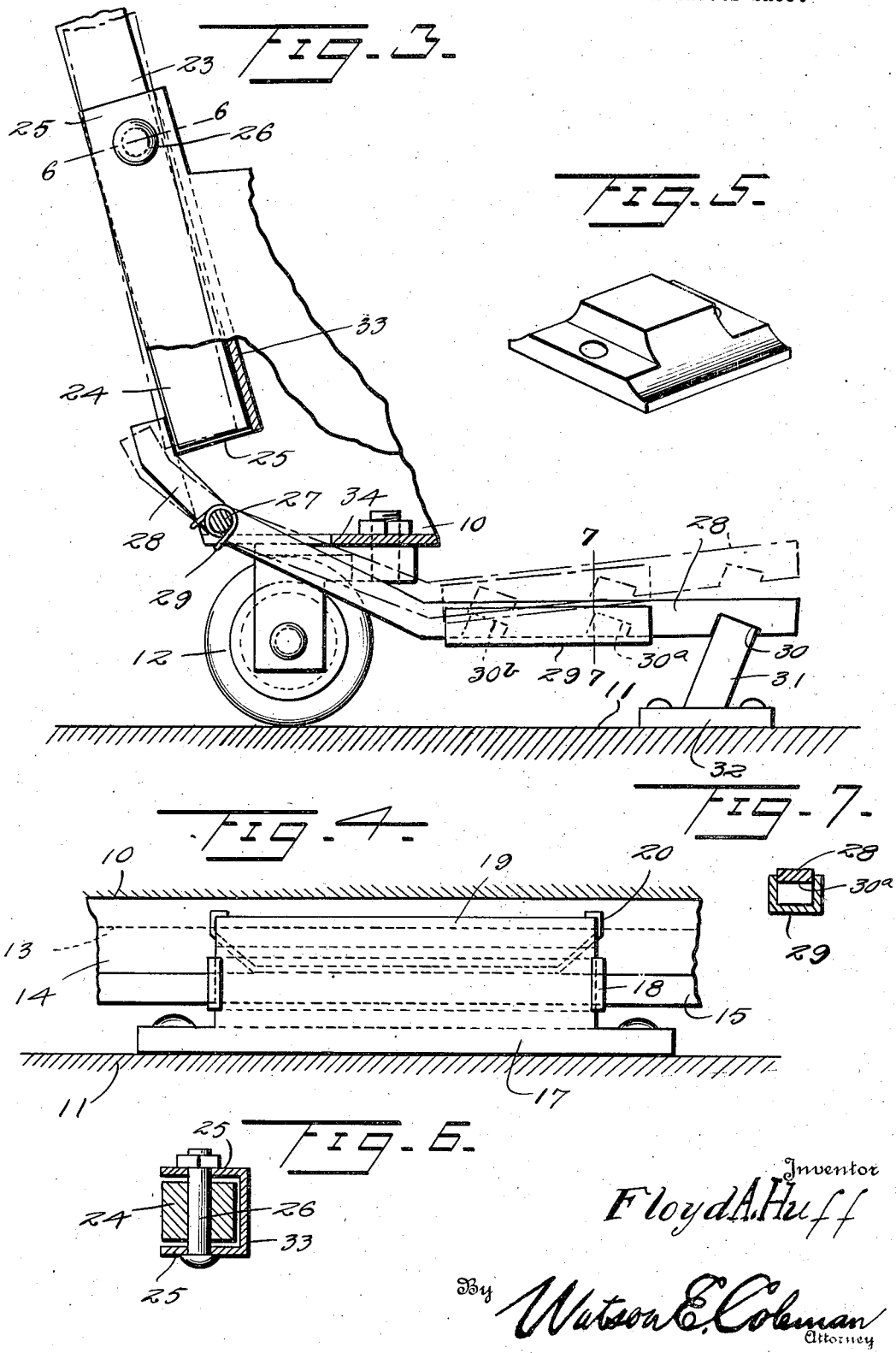

Patented Oct. 4, 1927.

1,644,528

UNITED STATES PATENT OFFICE.

FLOYD A. HUFF, OF MANSFIELD, OHIO.

AUTOMOBILE SEAT.

Application filed February 20, 1926. Serial No. 89,716.

This invention relates to automobile seats and more particularly to the construction of front seats of coach-type automobiles.

As is well known to those familiar with the art, in this type of automobile, it is necessary that a movable front seat be provided as the only access to the rear side of the automobile is through a door which is located in advance of the front seat.

An important object of this invention is to provide a coach seat which is shiftable to permit passage of an occupant of the rear end to or from his seat without the necessity of the person occupying the front seat leaving the same.

A further and more specific object of the invention is to provide a front coach seat mounted upon rollers and suitably guided so that it may be shifted upon the floor to advanced and retracted position, the seat in its advanced position providing space for the passage of a person from the door to the rear seat.

A still further object of the invention is to provide a seat of this character which is locked in its retracted position and in which the back of the seat provides a control for the lock.

A further object of the invention is to provide a device of this character which will be neat in appearance and durable and efficient in service.

A further object of the invention is to provide means whereby the seat may be selectively held in adjusted positions spaced longitudinally of the car deck.

These and other objects I attain by the construction shown in the accompanying drawings, wherein for the purpose of illustration is shown a preferred embodiment of my invention and wherein:—

Figure 3 is an enlarged detail view partially in section showing the construction and operation of the latch;

Figure 4 is a side elevation of the guide element;

Figure 5 is a perspective of a chock element;

Figure 6 is a section on the line 6—6 of Figure 3;

Figure 7 is a section on the line 7—7 of Figure 3.

Figure 1:
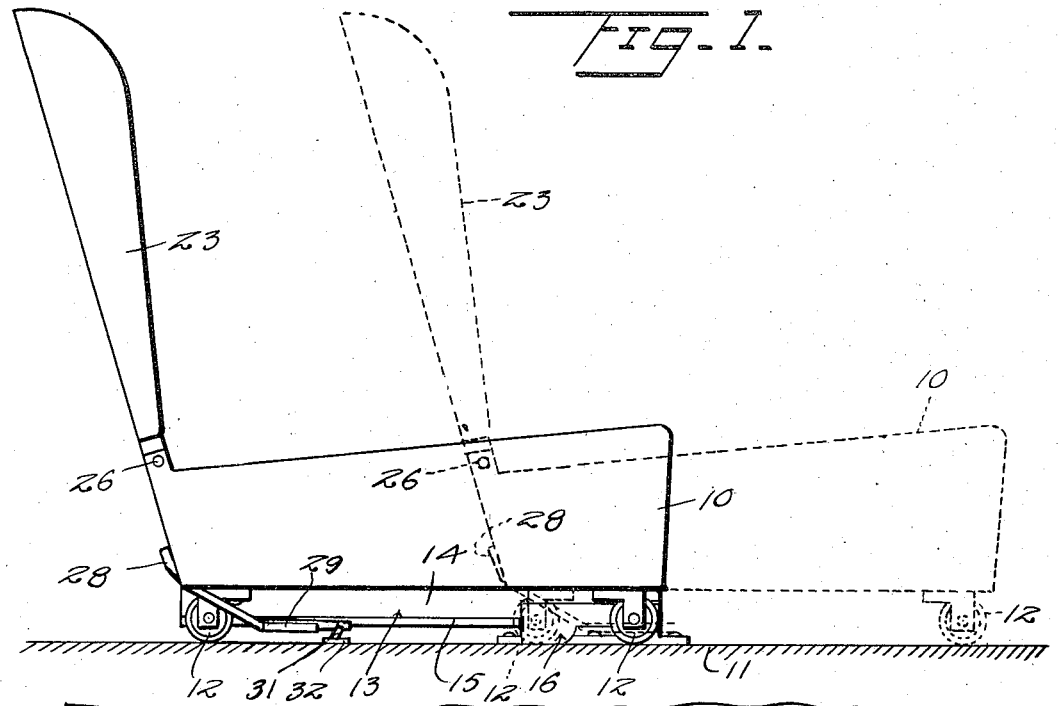
Figure 1 is a side elevation showing an automobile seat constructed in accordance with my invention.
Figure 2:
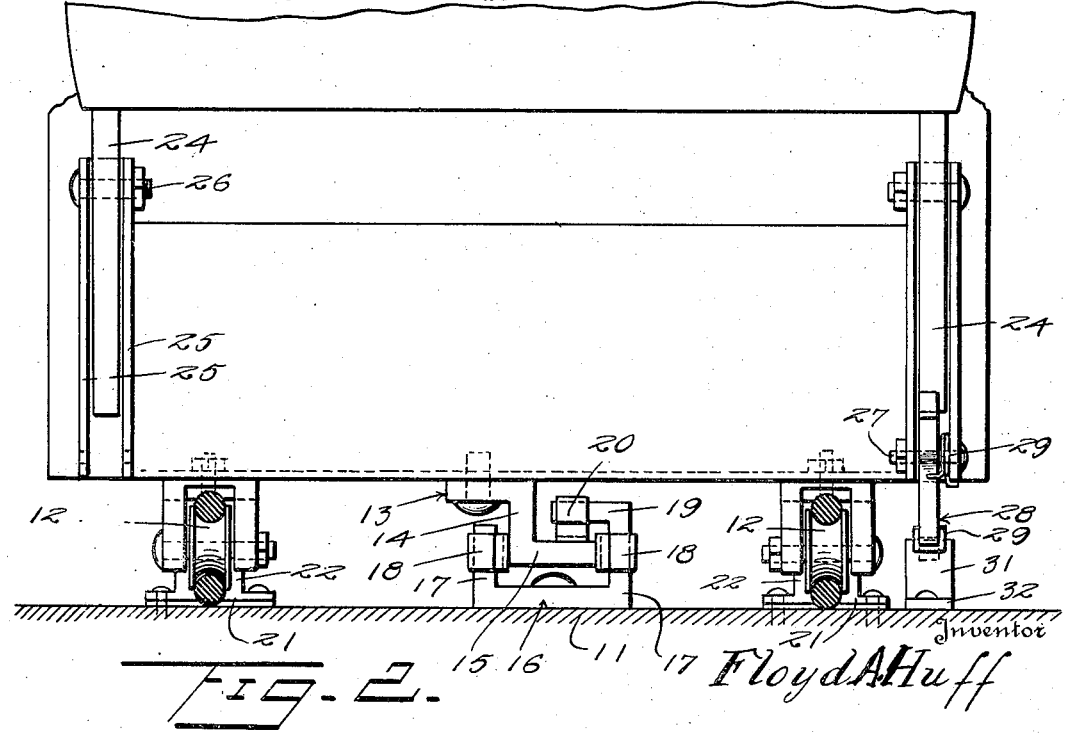
Figure 2 is an enlarged rear elevation thereof.

Referring now more particularly to the drawings, the numeral 10 generally designates an automobile seat which is supported in spaced relation to the deck 11 of the body by suitably journaled rubber tired rollers 12, one of which is arranged at each corner of the seat. Secured to the under surface of the seat at the center thereof and extending longitudinally of the seat is a guiding element or rail 13 in the form of a bracket having a vertically depending portion 14, the lower end of which has secured thereto a horizontally disposed flange 15. The pairs of wheels 12 at opposite sides of the seat are arranged in planes paralleling the longitudinal axis of the flange 15. This flange 15 coacts with a guide element 16 secured to the deck 11 beneath what is the forward portion of the seat when the seat is in its retracted position and this guide element includes a pair of vertically extending parallel arms 17 opposing opposite side edges of the flange 15 and provided with springs 18 yieldably engaging the flange 15, intending to maintain the same in a central position with respect to these arms. The upper end of one of the arms has a horizontal extension 19 projecting over the upper surface of the flange 15 and this extension has secured thereto a further spring 20 bearing downwardly against the upper surface of the arm and tending to constantly maintain the rollers 12 in engagement with the deck.

In transverse alignment with the guide 16 and so positioned that they are engaged by the front rollers 12 when the seat is in its retracted position are a pair of chocks 21, one of which is associated with each pair of rollers. The front and rear faces of these chocks have arcuately curved portions 22 for engagement by the rollers and these chocks provide positive limits for both forward and rear movements of the seat 10 by their engagement with the rollers 12.

The seat 10 is provided with a back 23 which has at its opposite side edges depending parallel arms 24, each extending into a channel formed between spaced vertical supports 25 secured to the seat 10 at the rear end thereof and pivoted thereto, as at 26, at a point above their lower ends. The supports 25 at the inner side of the seat, that is to say, the side of the seat adjacent the center of the vehicle, provide a pivot 27 for a latch arm 28 which is in the form of a bent lever, the upper end of which opposes the rear face of the lower end of the corresponding arm 24. This pivot further provides a mounting for a spring 29 forming a bias whereby the lower end of the latch arm 28 is forced downwardly. This lower end has in its lower surface a notch 30 which is adapted to receive an upwardly and forwardly angling lug 31 of a plate 32 secured to the deck and with which the notch aligns when the seat 10 is in its rearmost position and the rollers 12 at the forward end of the seat engage with the chocks 21. The rearward movement of the upper end of the seat back is limited by engagement of the arms 24 against a bumper plate 33 which may constitute the bight of a channel iron of which the arms 25 are flanges. When the arm is engaged with this plate 33 and the seat back is in its rearmost position, the lower end of the lever or arm 28 is permitted to drop so that the latch may engage with the lug 31. As the seat back is moved forwardly and the arm comes out of engagement with the plate 33, the upper end of the lever is forced rearwardly with the result that the lower end of the lever moves upwardly, disengaging the notch from the lug so that the seat may be moved. Upward movement of the lower end of the lever 28 is limited by a stop 34 and since this limit occurs at a time when the upper end of the lever is still engaged by the arm, forward movement of the upper end of the seat back is checked and the seat back rendered rigid to the seat. Thus, by the natural system of applying pressure to the back of the seat, the seat is freed for movement while pressure applied to the seat proper will not cause such movement. This eliminates the possibility of the seat being moved forwardly by engagement of the feet of an occupant of the rear seat therewith.

In addition to the notch 30 hereinbefore referred to, the lower end of the lever has additional notches 30ª, 30ᵇ spaced rearwardly of the notch 30. Slidable upon the under surface of the lower end of the lever is a U-shaped cover member C which may be shifted thereon to cover either the openings 30 and 30ª simultaneously or the openings 30ª and 30ᵇ simultaneously or to cover only the opening 30ᵇ. It will at once be obvious that if the rearmost opening 30ᵇ is exposed, the lug 31 will engage in this notch, limiting rearward movement of the seat at a point well in advance of its rearmost position. If the opening 30ᵇ is covered and the opening 30ª exposed, this notch will be engaged and the seat will be allowed to more nearly approach its rearmost position. Means are thus provided for securing the seat at any desired longitudinally adjusted position upon the deck. This construction is particularly adapted for use with the driver's seat of the vehicle so that the distance between the controls and the seat may be regulated to suit the needs of the particular driver who is handling the car.

It will, of course, be obvious that the construction hereinbefore set forth is capable of a certain range of change and modification without materially departing from the spirit of the invention and I accordingly do not limit myself to such specific structure except as hereinafter claimed.

I claim:—

1. In combination with a vehicle having a deck, a seat mounted for reciprocation upon the deck, coacting guiding elements carried by the seat and deck for maintaining the seat in a fixed path, means positively limiting the reciprocation of the seat, a back for said seat having depending arms pivoted intermediate their ends to the seat, a lever pivoted to the seat and having one end thereof disposed in the path of one of said arms, said lever having at its opposite end a notch and a member secured to the deck having a lug entering the notch of the lever when the seat is at one limit of its movement.

2. In combination with a vehicle having a deck, a seat mounted for reciprocation upon the deck, coacting guiding elements carried by the seat and deck for maintaining the seat in a fixed path, means positively limiting the reciprocation of the seat, a lever pivoted to the seat and having in one end thereof a plurality of longitudinally spaced notches, a member secured to the deck and having a lug for selective engagement in the notches and a member slidable upon said end of the lever for covering the notches rearwardly of a selected notch.

In testimony whereof I hereunto affix my signature.

FLOYD A. HUFF.